Patented Apr. 7, 1931

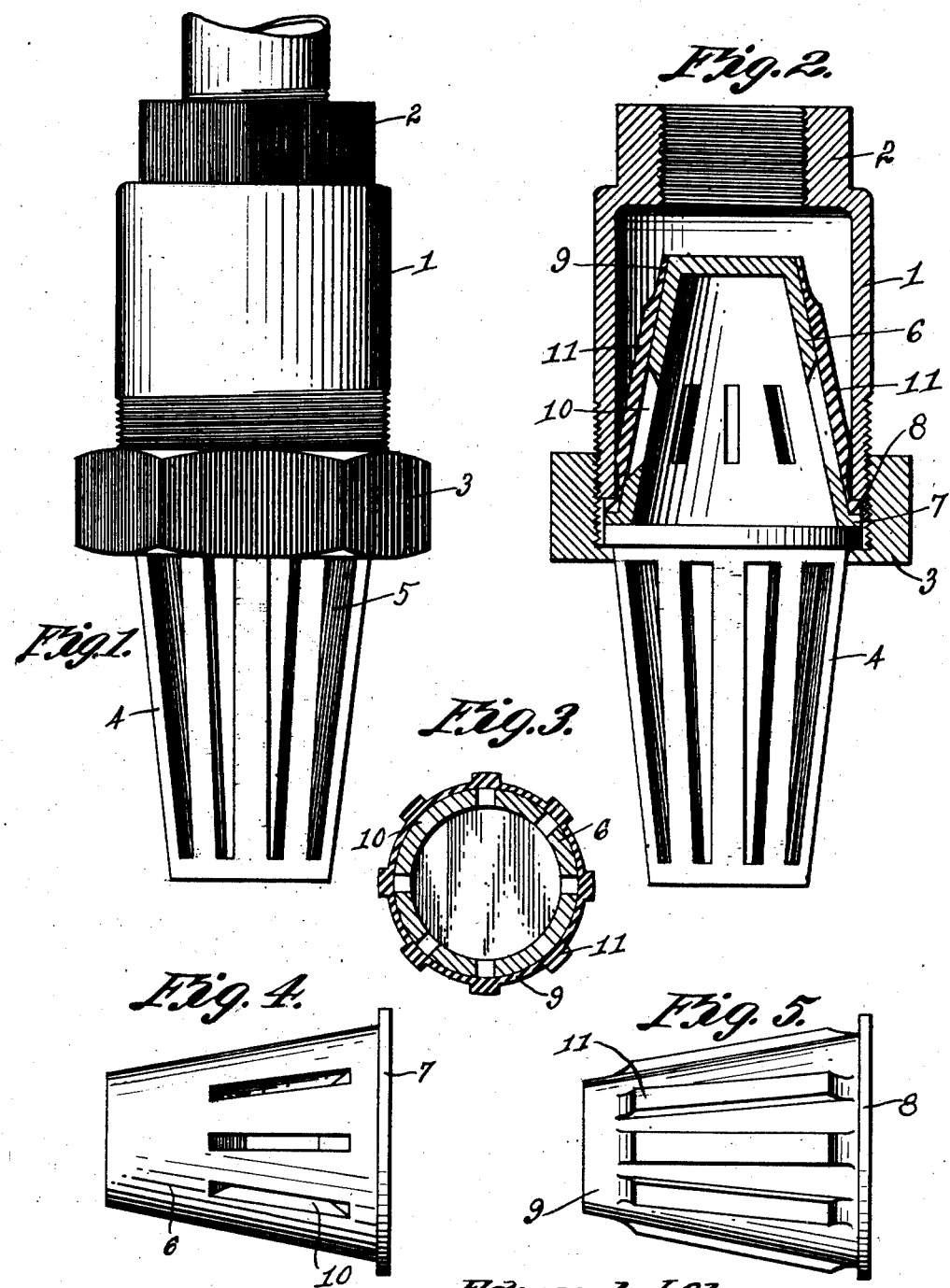

1,800,066

UNITED STATES PATENT OFFICE

EDWARD J. GLASS, OF WILLIAMSTOWN, KENTUCKY

AUTOMATIC VALVE

Application filed July 1, 1929. Serial No. 375,294.

This invention relates to automatic valves, and its general object is to provide a check valve that is positive in operation under all conditions and positions thereof, in use, is noiseless, will overcome all difficulties encountered with the flat or disk valve now commonly employed, utilizes no springs or studs, is simple in construction, inexpensive to manufacture and install, and is extremely efficient in operation and service.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:

Figure 1 is a view of my valve in elevation.

Figure 2 is a longitudinal sectional view taken therethrough.

Figure 3 is a transverse sectional view through the valve member.

Figure 4 is a view of the valve seat.

Figure 5 is a similar view of the resilient element of the valve.

Referring to the drawings in detail, the reference numeral 1 indicates the valve casing which as shown is substantially cylindrical in shape, with a reduced portion 2 at one end which is interiorly threaded while the outer side thereof is formed with flat faces to provide wrench engaging surfaces. The opposite end of the casing 1 is provided with exteriorly arranged screw threads for the purpose of accommodating the screw threads of a coupling 3 that is formed with a flange at one end to hold a flanged straining element 4 with respect to the body as clearly shown in Figure 2.

The straining element is substantially conical in form and has a plurality of equidistantly spaced slots 5 formed in the beveled wall thereof. The outer or small end of the straining element is closed.

The valve member per se includes what I term a seat 6 having a flange 7 formed with the large end thereof, and this flange is disposed in contacting engagement with the flange of the straining element whereby these parts are held in association through the instrumentality of the coupling 3. The valve which is formed from resilient material is likewise provided with a flange 8 arranged in engagement with the flange 7 of the seat 6 and between the exteriorly threaded end of the casing 1 and the flange 7 as shown. This arrangement secures and holds the valve which is indicated by the reference numeral 9 on its seat 6. The seat is of truncated conical formation, and has formed in its beveled wall, slots 10 that have walls inclined toward each other as best shown in Figure 2. The valve 9 as above set forth is formed from resilient material such as rubber or the like, and where it is found necessary it may be reinforced with steel strips or other reinforcing means, but in the present instance is shown as having a plurality of elongated tongues 11 formed with its outer surface, and the valve is arranged with respect to its seat in a manner whereby these tongues are disposed in registration or aligned with the slots 10, as best shown in Figure 3. The tongues have their ends beveled and the valve is of a size to snugly fit the seat 6, but due to the engagement of the exteriorly threaded end of the casing 1 with the flange 8 thereof, the valve cannot become casually removed from its seat. The small end of the seat is closed as shown.

From the above description and disclosure of the drawings, it will be obvious that when the valve is in use, the direction of flow of liquid will be through the slots 5 of the straining element 4, and the liquid will force the valve 9 from its seat by passing through the slots 10 thereof, however the flow of liquid in a reverse direction will be prevented as the natural inherent resiliency of the valve will retain the latter on its seat, with the result the liquid can not seep between the valve and its seat.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. A valve comprising a casing, a truncated conical valve seat arranged in said casing and provided with slots in its tapered wall, a truncated conical valve formed from resilient material and covering said slots, reinforcing strips formed on said valve and being aligned with said slots, and means for securing said valve and seat in said casing.

2. A valve of the character described comprising a casing having a reduced end interiorly threaded and formed with flat faces on its outer side to provide wrench engaging surfaces, the opposite end of said valve being exteriorly screw threaded, a flanged truncated conical shape valve seat arranged in said casing, a like shape valve formed from resilient material and fitting said seat, a flange included in said valve and engaging the flange of the seat, a flanged valve straining element of truncated conical formation, and a coupling for securing the flanges of the straining element, the seat and valve together and the parts in cooperative relation, said valve seat being formed with slots, and the valve covering said slots.

In testimony whereof I affix my signature.

EDWARD J. GLASS.